(No Model.)

J. M. JONES.
FRICTION CLUTCH.

No. 307,772. Patented Nov. 11, 1884.

WITNESSES
Ed. A. Newman.
Al. C. Newman.

By his Attorneys,

INVENTOR
John M. Jones.
Dodge & Son,

UNITED STATES PATENT OFFICE.

JOHN M. JONES, OF PALMYRA, NEW YORK.

FRICTION-CLUTCH.

SPECIFICATION forming part of Letters Patent No. 307,772, dated November 11, 1884.

Application filed April 24, 1884. (No model.)

*To all whom it may concern:*

Be it known that I, JOHN M. JONES, of Palmyra, in the county of Wayne and State of New York, have invented certain new and useful Improvements in Friction-Clutches, of which the following is a specification.

My invention relates to a friction device for clutching a band-pulley to a balance-wheel or shaft, designed more especially for use in connection with printing-presses, but capable of use with other machinery.

The invention consists of a hub or wheel formed with a beveled annular rim or flange and secured firmly upon the shaft to be driven, a band-pulley provided with a rim beveled to fit the first, and a lever pivoted to a swivel on the shaft, and arranged to press the band-pulley toward the fixed hub or wheel.

The invention further consists in providing the lever with a roller to reduce the friction between it and the band-pulley, and in an adjustable rack to retain the lever in position, whereby the friction between the band-pulley and the fixed hub or wheel may be regulated, as and for the purpose hereinafter explained.

Figure 1:
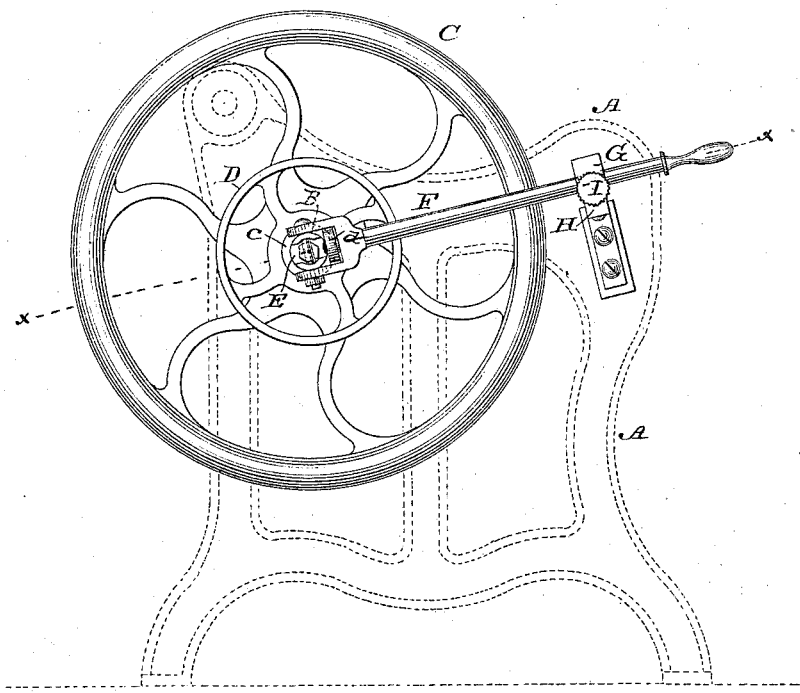
Figure 2:
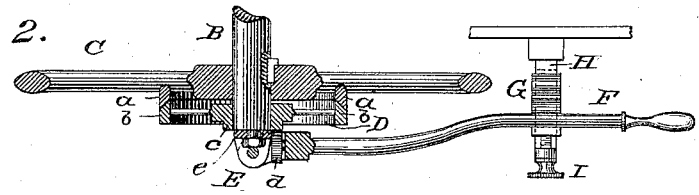
Figure 3:
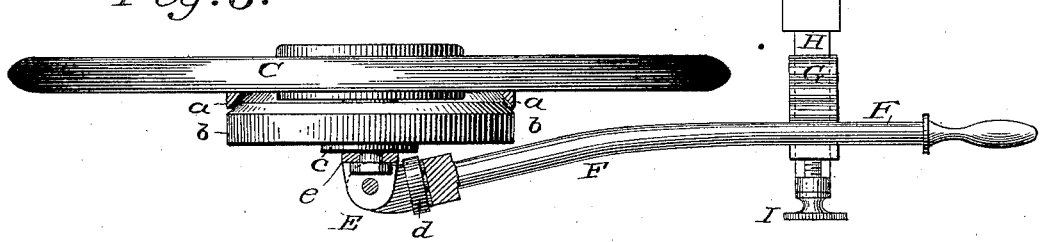

In the accompanying drawings, Figure 1 represents a face view of my improved device applied to a job-printing press; Fig. 2, a section on the line *x x* of Fig. 1; Fig. 3, an enlarged view of the same with lever reversed.

This invention is designed to take the place of the fast and loose pulleys commonly employed for applying power to printing-presses and other machinery, the objects being to economize space, reduce the cost of construction, facilitate the starting and stopping, and permit a variation in the speed of the machinery without varying that of the prime motor. With this end in view, I construct the clutching device in the manner indicated in the accompanying drawings, in which—

A represents a printing-press, the driving-shaft B of which is furnished with a fly-wheel, C, secured firmly thereon, said wheel being formed or provided with an annular flange, *a*, beveled on its inner face, as shown in Fig. 2. By the side of the balance-wheel is placed a band or belt pulley, D, which is free both to slide and turn on the shaft B, except when forced and held in its working position, as presently explained.

The band-pulley is formed with a beveled rim, *b*, made to accurately fit within the rim *a* of the fly-wheel, and is also formed with a central hub or boss, *c*.

Upon the shaft B is mounted a swivel-block, E, to which is pivoted or jointed a lever, F, carrying a roller, *d*, which is arranged to bear against the face or end of hub *c*, so that by moving the lever, and thereby causing the roller to press with greater or less force against the hub *c*, the band-pulley will be pressed toward the fly-wheel, and its beveled rim caused to press correspondingly against the rim of said fly-wheel, thereby locking the two together and causing them to move in unison.

A rack, G, provided with notches, is arranged in suitable position to receive the free end of the lever F, to hold the same at its different adjustments.

In practice I have found that by varying the pressure of the lever a greater or less amount of slip may be caused between the rims *a b*, and that the speed of the machinery can be thereby regulated and controlled. In order that this variation of pressure may be readily effected, I mount the rack G upon an arm or bracket, H, arranging it to slide thereon, and I provide a screw, I, by which the rack may be moved in or out, as indicated in Figs. 2 and 3. It will be readily seen that under the different adjustments of the block the lever will require to be moved inward different distances, consequently varying the pressure upon the hub of the pulley.

In order that the swivel-block E may be applied readily at any point upon a shaft, it is preferably formed, as shown in Fig. 3, in the shape of a yoke, to straddle the shaft, and provided with a block, *e*, held in position by a bolt or pin to close the open side or end of said yoke. The shaft may be grooved to prevent end-play of the block; or collars, either permanent or adjustable, may be arranged upon the shaft at each side of the block. It is not essential that the rims have their edges beveled, though such construction is preferred.

I am aware that friction-clutches have heretofore been made in a great variety of forms; but I am not aware that any one has hitherto mounted the block to which the lever is pivoted directly upon the shaft, or that it has ever been proposed to vary and regulate the speed of the driven machinery by varying the degree of friction between the friction-surfaces. By thus mounting the swivel-block upon the shaft I am enabled in all cases to easily and readily apply the lever, whereas under other constructions the pivot has required a special support on the frame of the machine or elsewhere, which in many cases is inconvenient or impracticable. I am also enabled to obtain great leverage, which cannot be done in all cases under former constructions.

By the use of the roller $d$, I am enabled to produce any requisite degree of friction between the fixed hub or wheel and the loose pulley without producing any considerable degree of friction between the lever and the pulley.

Having thus described my invention, what I claim is—

1. The herein-described clutching device, consisting of a hub or wheel rigidly secured upon a shaft, a pulley free to slide and rotate upon said shaft, and a lever pivoted to a swivel-block mounted on the shaft, and arranged to bear against the pulley and to hold it in contact with the fixed hub.

2. In combination with the fixed hub and the sliding pulley, a lever provided with a roller arranged to bear against the pulley and to force said pulley against the fixed hub or wheel, substantially as described.

3. The herein-described clutching device, consisting of shaft B, carrying fly-wheel C, the latter provided with a rim, $a$, pulley D, having rim $b$, and lever F, pivoted to swivel-block E, and arranged to bear against pulley D, substantially as and for the purpose set forth.

4. In combination with a friction-clutch substantially such as described, provided with an operating-lever, an adjustable rack to retain the lever in its different adjusted positions, substantially as explained.

5. In combination with the operating-lever of a friction-clutch, the sliding-rack G and adjusting-screw I.

JOHN M. JONES.

Witnesses:
M. HOPKINS,
G. M. NICHOLS.